(12) United States Patent
Nix

(10) Patent No.: US 6,529,014 B1
(45) Date of Patent: Mar. 4, 2003

(54) COATING THICKNESS GAUGE WITH AUTOMATED ZERO ADJUSTMENT AND/OR CALIBRATION

(75) Inventor: Norbert Nix, Köln (DE)

(73) Assignee: Automation Hans Nix GmbH, Cologne (DE)

( * ) Notice: Subject to any disclaimer, the term of this patent is extended or adjusted under 35 U.S.C. 154(b) by 0 days.

(21) Appl. No.: 09/552,264

(22) Filed: Apr. 19, 2000

(30) Foreign Application Priority Data

Apr. 21, 1999 (DE) .......................................... 199 18 064

(51) Int. Cl.$^7$ .............................................. G01R 27/26
(52) U.S. Cl. ...................... 324/662; 324/635; 324/644; 324/671; 324/699
(58) Field of Search ................... 324/230, 562, 324/671, 834, 662, 229, 635, 644, 699, 716; 702/170, 97; 361/793; 438/981

(56) References Cited

U.S. PATENT DOCUMENTS

| 4,255,709 A | * | 3/1981 | Zatsepin |
| 5,094,009 A | * | 3/1992 | Koch |
| 5,293,132 A | * | 3/1994 | Koch |
| 5,831,430 A | * | 11/1998 | Pfanstiehl |
| 6,243,661 B1 | * | 6/2001 | Baldwin |

OTHER PUBLICATIONS

US 5,751,608, 5/1998, Kock (withdrawn)*

\* cited by examiner

Primary Examiner—Kamand Cuneo
Assistant Examiner—Trung Nguyen
(74) Attorney, Agent, or Firm—Arent Fox Kintner Plotkin & Kahn, PLLC

(57) ABSTRACT

The subject of the invention is a coating thickness gauge with at least one measuring probe (14) which has at least one sensor (15, 15') as well as a device for the zero adjustment and/or calibration. The coating thickness device (10) is equipped with means to automatically activate zero adjustment and/or calibration when an interaction especially a contact or a relative movement between a sensor (15, 15') and a reference plate (11, 11').

23 Claims, 2 Drawing Sheets

Fig. 1a
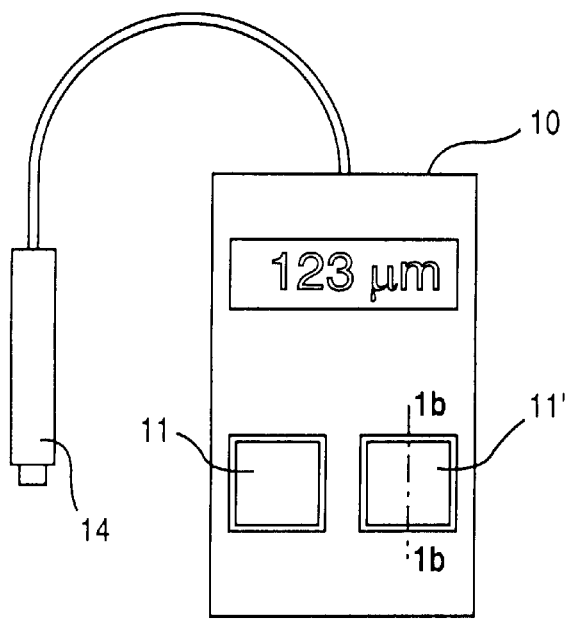
Fig. 1b
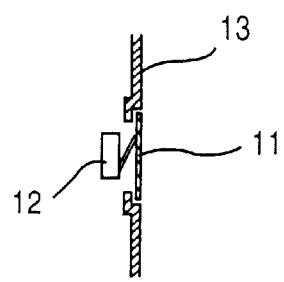

Figure 2A:
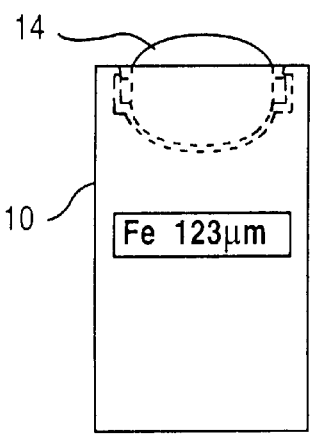

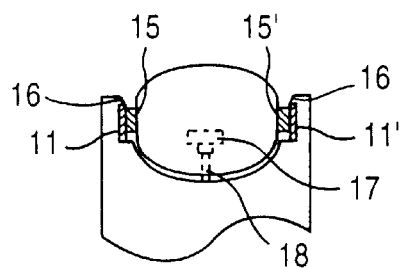
Fig. 2d

COATING THICKNESS GAUGE WITH AUTOMATED ZERO ADJUSTMENT AND/OR CALIBRATION

BACKGROUND OF THE INVENTION

1. Field of the Invention

This invention relates to a gauge to measure a coating thickness with at least one probe, that has at least one sensor as well as a device to make the zero adjustment and/or the calibration.

2. Description of the Related Art

All gauges on the market to measure a coating thickness require a regular check of the zero adjustment and, if necessary, of the calibration. This has several reasons. Either the gauges were out of use for a longer period of time, batteries had to be exchanged, or measuring conditions considerably vary from normal conditions due to extreme environmental temperature fluctuation, changes to kind or thickness of substrate, the gauge or the probe themselves. As a rule, even the exchange of the probe requires a new zero adjustment or calibration. To do so, prior to taking a measurement the gauges or the probes have to be placed on a reference plate and the zero adjustment or calibration has to be started by pressing the operation button. This procedure is, for example, described in patent DE 34 04 720.

U.S. Pat. No. 5,293,132 also states a method for zero adjustment, where the user has to decide on which substrate a measurement will be taken in order to, if necessary, manually switch the gauge in case of a change of material. In case of a material change the user is requested by the device to make a zero adjustment. The user is compelled by the described device to do the zero adjustment, as otherwise no measurement can be taken. With other known devices there is the danger that with omitted adjustment of the device the measuring results are falsified. By no means, the device has integrated reference plates so that via control elements the device has to be informed about the type of reference plate in use during manual adjusting. This may cause confusion.

A further disadvantage of the previous gauges is that the zero adjustment and positioning depends on how it is performed. The placing of the probe at different spots or uneasy placing may possibly cause very different results. This does not only lead to inaccuracy but also makes it difficult to compare measuring results of measuring gauges that usually have comparable characteristics.

Furthermore, devices to measure a coating thickness with separate probes are known, that are either connected with the device via a cable or data are wirelessly transferred to the measuring gauge. The probes are designed in a way that the taking of measurements starts upon placing them on the surface to be tested. But control elements are still necessary to do the zero adjustment or calibration. The adjustment or calibration on reference plates has to be started and realized individually by the user.

SUMMARY OF THE INVENTION

It is the task of the invention in question to propose a coating thickness measuring device that avoids the usual difficulties and error sources that are resulting from zero adjustment and calibration necessary for the known measuring gauges.

This task is solved by the device in accordance with the invention by providing the coating thickness measuring device with means that in case of interaction, especially in case of contact or a relative movement between a sensor and a reference plate, automatically activate the zero adjustment or calibration. Especially, the advantage of this device is that the user of the device always gets a correct adjustment made under the same conditions. Thus the adjustment is not subjected to individual influences.

Preferred versions of the invention are defined by the sub-claims.

For example, a device with a removable probe unit in accordance with a preferred version is proposed, that upon having been taken out automatically performs the zero-adjustment thus the measurement can be taken immediately.

Moreover, the coating thickness measuring device in accordance with the invention can have integrated reference plates. Advantageously, when placing the probe the device recognizes on which reference plate the zero-adjustment or calibration shall be made and automatically carries it out without control elements being actuated by the user.

DETAILED DESCRIPTION OF THE INVENTION

Figure 2B:
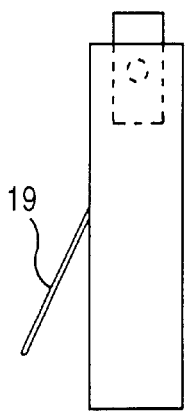
Figure 2C:
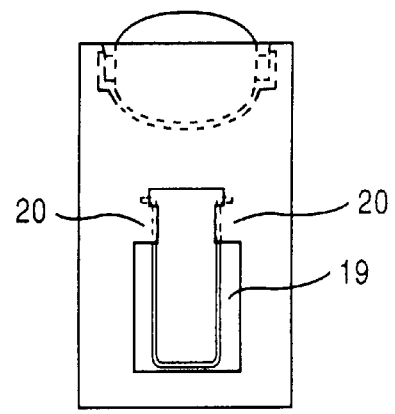
Figure 3:
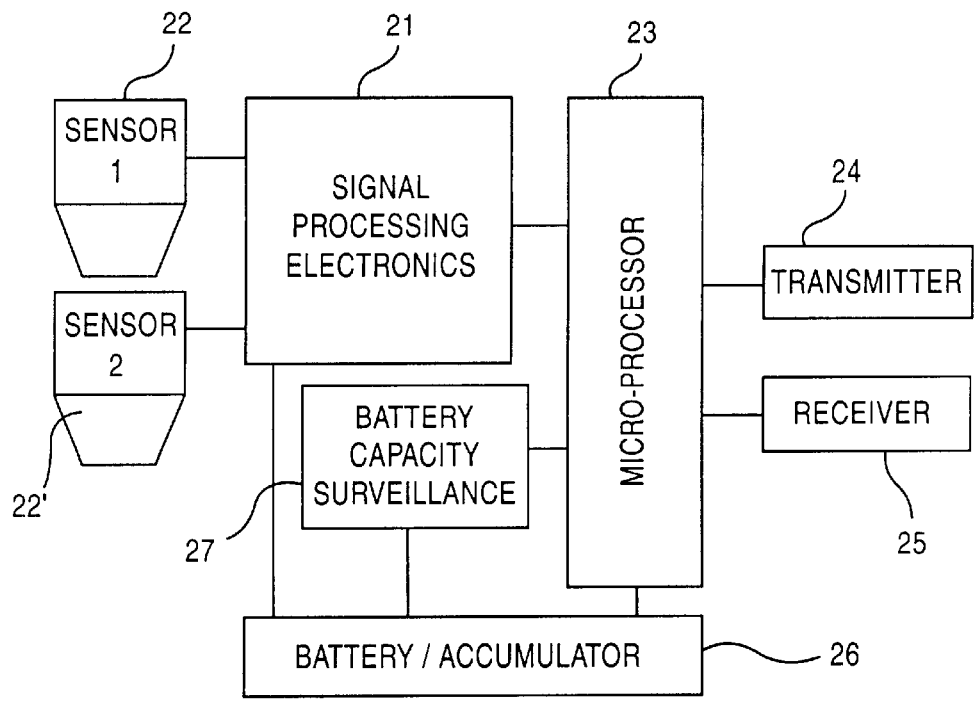
Figure 4:
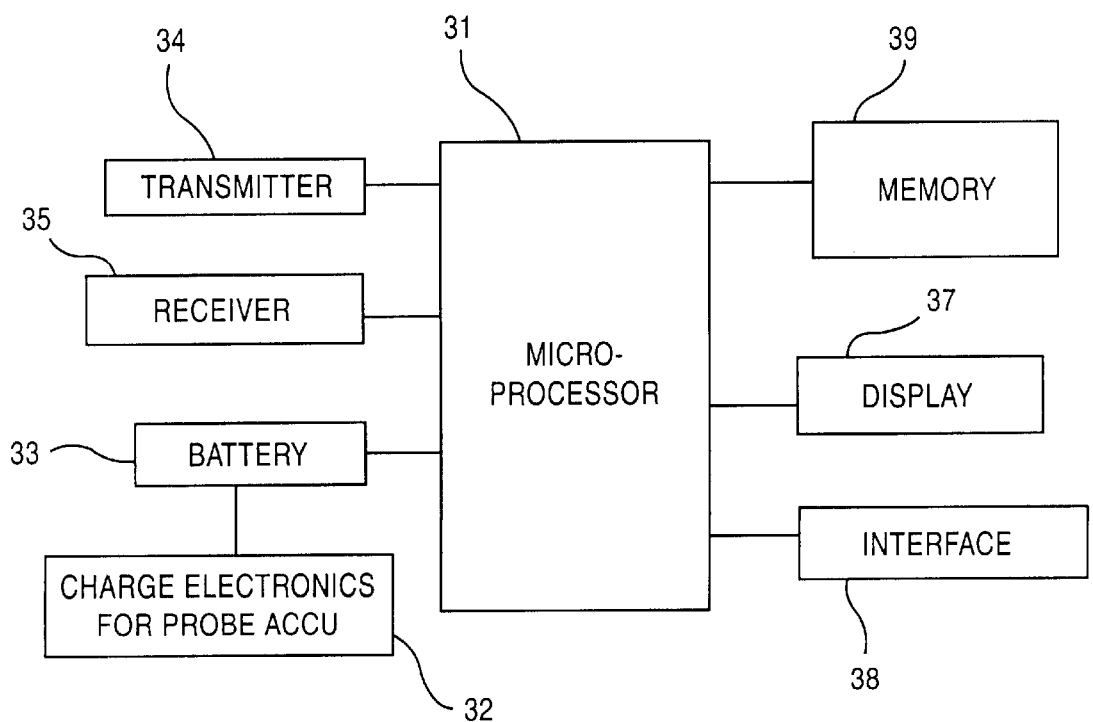

The invention is described by means of preferred versions with reference to enclosed illustrations as follows:

FIG. 1 a principle description of a coating thickness measuring device in accordance with the invention;

FIG. 2 a preferred version of a coating thickness measuring device in accordance with the invention with a fixture for the probe;

FIG. 3 a principle illustration of a probe unit for a coating thickness measuring device with a micro processor; and FIG. 4 a principle illustration of a coating thickness measuring device with a micro processor interacting with the probe unit.

FIG. 1 shows the principle illustration of a coating thickness measuring device in accordance with the invention. The device 10 is connected with one or more reference plates 11,11', to which a switch respectively a sensor 12 is connected that records the placing of a measuring probe. The measuring probes 14 are zeroed on the uncoated reference plates and are calibrated on the plates with a known coating thickness. A signal, depending on whether there is a zero reference plate or a calibration plate, will be sent to the coating thickness measuring device 10 and a zero adjustment or calibration will be started automatically. After that the measuring probe 14 is adjusted and measurements can be taken. Advantageously, these reference plates 11,11' are integrated in the device 10. In a possible version the plates 11,11' are mounted vertically and elastically to the outer case 13, with switch or sensor 12 mounted to the inner side of plate 11. Upon placing the measuring probe 14 the plates are pushed inside and via switch respectively sensor a signal is caused that will be transmitted to the control unit (e.g. micro processor). There the zero adjustment or calibration will be started. Alternatively, a solution is possible where the signal given by the sensors (e.g. an electromagnetic field or acoustic signal) will be detected by sensor 12 which is connected to reference plate 11 so that the plates can be fixed.

FIG. 2 shows a preferred version. The coating thickness measuring device 10 is equipped with a fixture for one or more measuring probes. Reference plates 11, 11' are integrated in the fixture. In particular, it is advantageous to arrange two sensors 15, 15' at opposite ends of a separate case 14 that should be smaller-than the case of the device 10. Thus the fixture can be designed in a way that the case with the sensors can directly be put and locked in, the case of the device. Mounting of the measuring probes is facilitated by the ramps 16. Both sensors 15,15' of the measuring probe are pressed against the corresponding reference plates 11,11'. When taking out the measuring probe 14 it is activated and subsequently the zero adjustment or calibration of both sensors-starts via a switch or a special sensor while the sensors 15,15' are still lying on the reference plate 11,11'. Activation can be made as follows: by unlocking the measuring probe 14 the reference plates 11,11' are moved towards sensors 15,15', thus the sensors are pushed into the case 14 and a switch is released in the case of the probe 14. An alternative could be,that upon pushing the case of the probe 14 into the coating thickness measuring device 10 a pin 18 at the fixture that fits to a corresponding hole in the probe case releases a switch 17 of the probe. It is also possible to release and close an electrical contact directly between fixture and probe case 14.

Of course, such a coating thickness measuring device is also possible for a measuring probe with only one sensor. In this case only one reference plate 11 is necessary in the fixture of the coating thickness measuring device 10. Two reference plates 11,11' arranged as shown in FIG. 2 are necessary if the probe is equipped with a sensor comprising two measuring principles. However if the measuring probe 14 only has one sensor 15, the probe 14 is placed in the fixture such that the sensor 15 is directed towards the reference plate 11 or 11' which corresponds to the measuring principle to be used after taking out the measuring probe. In this case, upon releasing the measuring probe a trial measurement will be taken to check which reference plate 11 or 11' is concerned. Subsequently, the zero adjustment or calibration is started depending on the measuring principle assigned to the reference plate. Upon removing the gauge measurements are taken using this principle. If the measuring principle is to be changed, as for example measurements on a different substrate are to be taken, the sensor has to be inserted into the fixture with the sensor lying on the reference plate that is assigned to the measuring principle applicable to the other substrate. Upon a new release corresponding processes for the other measuring principle are started. Other solutions for a measuring probe with only one sensor as shown in FIG. 2 are possible. For example, the reference plate could be built horizontally into the fixture, so that the measuring probe is inserted with the sensor in front. In case of a measuring probe for two measuring principles the multiple sensor would be arranged in a position laterally displaced from the center axis of the case of the measuring probe 14. Correspondingly the reference plates would be arranged at the left and right side of the axis of the case 10. In order to select a certain measuring principle the measuring probe is inserted into the fixture with the sensor over the corresponding reference plate.

For a combined device to measure ferrous and non-ferrous metals only one reference plate is imaginable. In this case the steel sheet has a thin layer of a non-ferrous metal with a thickness of 20–50 $\mu$m. This thin non-ferrous layer is sufficient as for the measurement on non-ferrous metals high frequent electromagnetic fields (normally>10 MHz) are used, Due to their "skin effect" they only have a penetrating depth of about 20 $\mu$m. In case of zeroing or calibration of the sensor for a measurement of steel the known thickness of the non-ferrous layer is considered.

The coating thickness measuring device in accordance with the previous description also allows the use of special-shaped measuring probes, where an adapter to release the zeroing or calibration is connected with the measuring probe. Instead of the probe this adapter which is equipped with above mentioned release mechanism is inserted into the fixture. Advantageously, the adapter has the same geometry as a single or multiple probe that can directly be inserted into the fixture. For example, a measuring probe can be realized whose sensor is mounted to a rod (possibly liftable like a telescope). This rod in turn is connected with the adapter either rigidly or by means of a cable. Upon releasing the adapter the measuring probe is automatically zeroed on an external reference plate. With this device coatings at spots difficult to reach or in tubes can be measured. Also other measuring probes can be realized so that with only one coating thickness measuring device different measuring probes can be used.

Integrated parts of the preferred version in accordance with FIG. 3 are the electronics to record probe signals 21 as well as a micro processor 23. Thus immediately after receipt signals can be digitized, before they are transmitted to the coating thickness measuring device. This is advantageous in case of longer transmission distances as digitized data are less sensitive. Furthermore, temperature differences between measuring probe 14 and coating thickness measuring device 10 cannot cause errors, as the temperature correction of the measuring signal is already done in the measuring probe and digitized data, that are received by the coating thickness measuring device, only have to be converted into a coating thickness value by the device's micro processor 31.

Measurements taken by one or more measuring probes 14 can be transmitted to the coating thickness measuring device 10 in different ways. The easiest way of transmission is via cable. In this case the power supply of the measuring probe can be made by cable as well. Alternatively, transmission can be made optically. In the preferred version data are transmitted wirelessly. In this case several transmission solutions are possible. In the easiest form measuring probe 14 is only equipped with a transmitter 24 that after taking measurements transmits the results to the coating thickness measuring device. The gauge itself is equipped with a receiver 35 as shown in FIG. 4. Advantageously, the measuring value is sent three times in a row for data security and in order to detect and eliminate incorrect transmission.

Moreover, there is the possibility to have the correct data transmission indicated by the coating thickness measuring device via optical or acoustic signal. A further possibility could be a bi-directional transmission line. For this measuring probe 14 and coating thickness measuring device 10 need to have a transmitter 24,34 as well as a receiver 25,35. Thus there is the possibility to send a return message to the measuring probe 14 by the microprocessor 31 of the coating thickness measuring device 10, and the probe recognises whether the measuring result has been received correctly. If not, the microprocessor 21 of the measuring probe repeats the measuring procedure. Even in this case an optical or acoustic signal can indicate a correct or incorrect data transmission. Via a bi-directional transmission line probe-specific data (for example serial number, probe parameter), e.g. determined during calibration of the probe, can be transmitted to the probe. In this case, switch 17 and spike 18 as shown in FIG. 2 can be left out because individual commands (e.g. for zero adjustment) can be transmitted to the probe by the coating thickness measuring device.

An identification is transmitted together with the essential signal by means of which the coating thickness measuring device recognises which sensor or measuring principle was used. Thus the measuring result can be clearly identified, indicated and/or transmitted to another instrument (printer, computer).

In case of wireless data-transfer, the measuring probe is powered by a battery 26. In a preferred version the measuring probe is equipped with an accumulator 26. While the measuring probe is in the fixture of the coating thickness measuring device 10, the accumulator 26 is being loaded by the charging electronics 32 of the device 10. This is achieved by electric contacts between the measuring probe and the device or inductively. It is advantageous to have the charge condition of the battery respectively the accumulator 26 controlled by a battery charge control system which is regularly checked by the micro-processor 23. If the charge condition of the battery/accumulator 26 falls below a defined level a signal is sent together with the data transmission. Advantageously, this signal appears in display 37 of the coating thickness measuring device 10.

In addition to a display in the case the coating thickness measuring device 10 can be equipped with an interface 38 to connect the device, e.g. with a computer or printer. Via this interface 38 measuring data can be downloaded to a computer or printer for memorising and/or processing. Data and commands can also be uploaded into the device 10. Advantageously, this interface is an infrared interface. Furthermore, the coating thickness measuring device 10 can be equipped with a memory 39 to store the measuring values taken by the probe 14 and transmitted to the device 10.

For easier handling the back of the gauge can be equipped with a handle 19 that can be fixed in several positions. If folded up the handle clicks behind the device's guide rail 20 for serving as a fixing clip e.g. to attach the coating thickness measuring device to clothes. The handle can be easily folded by pressing the sides. The folding angle can be varied in order to place the device in a suitable leaning angle. This allows an easy one-handed use of the device and the user can concentrate himself on using the measuring probe 14.

What is claimed is:

1. Device for measuring a coating thickness comprising:
   at least one measuring probe which has at least one sensor;
   a device for zero-adjustment and/or calibration receiving a measurement from said at least one measuring probe; and
   means for automatic activation of zero-adjustment and/or calibration of the device upon interaction between said at least one sensor and a reference plate;
   wherein said zero-adjustment and/or calibration is based on at least one said interaction.

2. Device of claim 1 further comprising a plurality of reference plates, each reference plate having a known coating thickness to calibrate the device to measure a coating thickness.

3. Device of claim 2, wherein said means for automatic activation of zero-adjustment and/or calibration comprises a switch or sensor.

4. Device of claim 3, wherein said means for automatic activation of zero adjustment and/or calibration comprises a switch or sensor for said each reference plate.

5. Device of claim 1 or 2, wherein at least one reference plate being connected to the coating thickness device or more especially integrated in the device.

6. Device of claim 1 or 2, further comprising a fixture for removably receiving said at least one measuring probe can be mounted in a fixture of the device.

7. Device of claim 6, wherein said plurality of reference plates are integrated in the fixture.

8. Device of claim 6, wherein each reference plate of said plurality is mounted in the fixture under a pole of each measuring probe.

9. Device of claim 6, wherein a combined reference plate is mounted in the fixture where the reference plate and coated with a non-ferrous metal sheet whose thickness is being taken into account when the probe is adjusted for measurements on steel or iron.

10. Device of claim 1 or 2, wherein said means for automatic activation of zero-adjustment and/or calibration automatically performs zero-adjustment and/or calibration of said device when said at least one measuring probe being dismounted from the device.

11. Device of claim 1 or 2, further comprising a means to digitize signals directly in a single probe or a multiple probe.

12. Device of claim 1 or 2, wherein said at least one probe is connected to the device via a cable.

13. Device of claim 1 or 2, wherein said at least one probe communicates with said device via a wireless or inductive signal and/or data transfer.

14. Device of claim 13, wherein said at least one probe comprises a transmitter for transmitting said signal and/or data and said device comprises a receiver for receiving said signal and/or data.

15. Device of claim 13, further comprising a bi-directional transfer line for transmitting the signal and/or data between said at least one probe and the device.

16. Device of claim 13, wherein said at least one probe being equipped with a power supply.

17. Device of claim 16, wherein said at least one probe being equipped with an accumulator, being recharged when said at least one probe is mounted in the fixture of the device.

18. Device of claim 16, where said power supply is a battery, and a warning signal is sent together with measuring data being transferred and displayed in the device when a charge condition of the battery is below a certain level.

19. Device of claim 1 or 2, wherein said at least one probe communicates with said device via an optical signal and/or data transfer.

20. Device of claim 1 or 2, with the device recognizing which probe of said at least one probe is being operated and correspondingly evaluating the signal and adding an identification mark to the result which corresponds to the probe being used.

21. Device of claim 1 or 2, further comprising an interface through which the measuring data, which are processed by the probe and transferred to the coating thickness measuring device, are being downloaded to a computer or a printer.

22. Device of claim 1 or 2, further comprising a memory to store the data which have been processed by the probe and transferred to the device.

23. Device of claim 1 or 2, further comprising a handle mounted on a back of the casing of the device which can be used folded as tab and unfolded as a stand for the device.

* * * * *